United States Patent Office 3,391,031
Patented July 2, 1968

3,391,031
COMPOSITION AND PROCESS FOR FORMING IMPROVED CHROMATE CONVERSION COATINGS ON ALUMINUM
William S. Russell, Warren, Herman J. Lodeesen, Royal Oak, and Ashok J. Champaneria, Detroit, Mich., assignors to Hooker Chemical Corporation, Niagara Falls, N.Y., a corporation of New York
No Drawing. Filed Nov. 10, 1964, Ser. No. 410,262
20 Claims. (Cl. 148—6.2)

ABSTRACT OF THE DISCLOSURE

A composition for forming a protective coating on aluminum-containing surfaces which consists essentially of an aqueous acidic solution containing hexavalent chromium ions, fluoride ions, and at least 0.01% of an activator composition. The activator composition is formed of at least two ions selected from the group consisting of tungsten, molybdenum, arsenic, vanadium and uranium, at least one of the ions selected being present in an amount of at least 0.005% by weight of the coating composition and the sum of the amounts of the remaining ions selected being present in an amount of at least 0.005% by weight of the coating composition.

This invention relates to an improved composition and process for coating metal surfaces and more particularly relates to improved compositions and methods for chemically coating aluminum and aluminum alloy surfaces to provide corrosion resistant and paint bonding coatings on such surfaces.

In the past, many compositions and processes have been proposed for producing chemical films on surfaces of aluminum and aluminum alloys. Of particular interest, especially from the standpoint of commercial processes, are those methods wherein the aluminum containing surface to be coated is contacted with an acidic solution containing a source of hexavalent chromium. Typical of processes of this type are those described in United States Patents 2,276,353, 2,471,909, 2,472,864, 2,796,370, 2,796,371, 2,507,956, 2,843,513, 2,859,144, 2,868,679, 2,839,439, and 3,009,842. In such processes it has been attempted to provide a method which is useful in treating many different types of aluminum and aluminum alloy surfaces while still having a coating solution which is relatively simple to prepare initially and to maintain in effective coating condition during use.

Basically, these prior art compositions have been aqueous acidic solutions containing a source of hexavalent chromium ions and fluoride ions. Additionally, it has been the practice to add various additional anions or cations to the solution to obtain various specific objectives, such as activation of the solution to obtain increased coating weight and coating efficiency. Exemplary of such modified compositions is that set forth in U.S. Patent 2,796,370 wherein ferricyanide is utilized as the modifying or activating anion.

Although these ferricyanide activated chromate-fluoride coating solutions have enjoyed appreciable commercial use, some difficulties have been encountered in both the makeup and continued operation of these solutions. For example, it has been found that these ferricyanide activated solutions are subject to heat degradation at temperatures above about 50° C. and are also relatively sensitive to acidity. Accordingly, unless the temperature and acidity are carefully controlled in the solution, degradation of the ferricyanide takes place and it becomes incapable of maintaining the solution in the desired coating-forming condition. Moreover, ferricyanide activated chromate-fluoride solutions often suffer a decrease in coating ability merely upon standing at room temperature and replenishment of these solutions is complicated because the ferricyanide and chromate-fluoride components must be added separately and maintained in separate containers before addition so as to avoid reaction between the chromate and the ferricyanide.

For the most part, the difficulties encountered in the use of the ferricyanide-activated chromate-fluoride coating solutions have been overcome by use of the compositions and processes as set forth in a co-pending application S.N. 342,275 filed Feb. 3, 1964. As described in this application, these compositions comprise an aqueous coating solution which contains the hexavalent chromium ions, the fluoride ion, aluminum fluoride complex ions and, as an activator in place of the ferricyanide, the tungsten ion. By the use of such coating solutions there is obtained a high speed coating process which gives good coating weights and efficiencies and which is relatively simple to operate and maintain in coating-forming condition.

It has been found, however, that in the use of such coating compositions, there is a build-up of impurities or foreign cations in the operating solution and in particular, there is an increase in the concentration of trivalent chromium ions. When the trivalent chromium content of the solution exceeds about 0.1% by weight of the solution, it has been found that there may be a decrease in both the coating weights and efficiencies obtained with the solution. While this build-up of foreign cations, such as trivalent chromium ions, can be controlled by using an ion exchange unit, such as that described in U.S. Patent 2,967,791, it is preferable in some instances for the coating process to be carried out without such equipment. It is, therefore, desirable to provide a coating solution and process which consistently will give high coating weights and coating efficiencies without the use of such ion exchange units, even when the coating solution contains trivalent chromium ions in amounts in excess of about 0.1% by weight.

It is, therefore, an object of the present invention to provide an improved chromate-fluoride coating solution which operates at high speed and high efficiency to form a corrosion-resistant, paint receptive coating on aluminum surfaces and which is capable of operating consistently at high coating rates and high efficiencies over a wide range of pH and temperature values even with a trivalent chromium content in excess of 0.1% by weight.

Another object of the present invention is to provide an improved process for coating aluminum containing surfaces, which process may be carried out with a coating solution containing trivalent chromium ions in excess of about 0.1% by weight with consistent high coating rates and efficiency without the need for regeneration of the solution.

These and other objects of the invention will become apparent to those skilled in the art from the description of the invention which follows.

Pursuant to the above objects, the present invention includes a coating composition which comprises an aqueous acidic solution, substantially free of sulfate and lithium ions and cations of Group II–A of the Periodic Table and which contains hexavalent chromium ions, fluoride ions, and, at least 0.01% by weight of the coating composition of an activator formed of at least two ions selected from the group consisting of tungsten, molybdenum, arsenic, vanadium and uranium, at least one of the ions selected being present in an amount of at least 0.005% by weight of the coating composition and the sum of the amounts of the remaining ions selected being at least 0.005% by weight of the coating composition, the amounts of said ions being calculated as the respective metals. This composition is characterized by the fact that it consistently operates at high coating rates and efficiencies even when the composition contains trivalent chromium ions in an amount in excess of about 0.1% by weight of the composition.

More specifically, the composition of the present invention is an aqueous acidic solution which is substantially free of lithium ions, sulfate ions, and cations of Group II-A of the Periodic Table, namely, beryllium, magnesium, calcium, strontium, and barium. It has been found in the present composition, that not only do the above ions not add any beneficial properties to the composition but, in many instances, are in fact detrimental to the operation and maintenance of the coating solutions and to the protective coatings which are produced. Accordingly, it is desirable that the coating solutions of the present invention be substantially free of these ions. By "substantially free" it is meant that the solutions are free of at least amounts of these ions which are detrimental to the solution or coating produced. It is not necessarily intended, however, to exclude minor amounts of these ions which are not detrimental, such as amounts which may occur in the water used in making up the aqueous solution, e.g. less than 0.05%.

The aqueous acidic coating solutions of the present invention contain hexavalent chromium ions in an amount sufficient to provide the desired chromium coating on the aluminum surfaces treated therewith. Desirably, these solutions contain hexavalent chromium ions, calculated at $CrO_3$ in an amount within the range of about 0.05 to about 1%, weight/volume (w./v.). The hexavalent chromium ions may be added to the solution in many suitable forms, such as chromic acid, or one or more of the water soluble or water dispersable salts of chromic acid. Exemplary of the salts which may be used are the chromates and dichromates of sodium, potassium, and ammonia as well as admixtures thereof with each other and/or with chromic acid.

The fluoride ion is present in the subject composition in an amount sufficient to cause attack of the aluminum containing surface to be coated and to effect formation of the resulting coating on this surface. Desirable, the fluoride ion is present in an amount within the range of about 0.16 to about 2.7 percent w./v. As with the hexavalent chromium ion, the fluoride ions may be added to the present composition in many convenient forms, including various fluorine-containing compounds which are capable of ionizing in the aqueous acidic solutions of the invention to provide fluoride ions. Exemplary of such fluorine containing compounds which may be used are hydrofluoric acid, fluosilicic acid, fluoboric acid, as well as the various water soluble or water dispersable salts thereof such as the sodium, potassium, and ammonium salts.

As has been indicated hereinabove, the activator composition, resulting from the combination of at least two of the ions selected from the group consisting of tungsten, molybdenum, arsenic, vanadium and uranium is present in an amount of at least 0.01% w./v. with at least one of the ions selected being present in an amount of at least 0.005% by weight of the coating composition and the sum of the amounts of the remaining ions selected being at least 0.005% by weight of the coating composition, the amounts of said ions being calculated as the respective metals. Although the maximum amount of the activator composition used has not been found to be critical, amounts up to the maximum solubility of the activator in the solution giving satisfactory results, it has been found that when amounts of the activator substantially in excess of about 0.4% w./v. are used, no appreciable additional improvements in coating weight and coating efficiency are obtained. Accordingly, it is desirable that the activator composition is present in the coating solution in amounts within the range of about 0.01 to about 0.4% w./v. It has been found that by the use of this activator composition which is formed of at least two of tungsten, molybdenum, arsenic, vanadium and uranium, there is obtained a synergistic activation of the coating solution in terms of the coating weights and coating efficiencies obtained, in coating solutions which contain trivalent chromium ions in amounts in excess of about 0.1% w./v. In such solutions, however, this activation is not obtained when using only one of the activator components, i.e., tungsten, molybdenum, arsenic, vanadium or uranium, in amounts equal to the total amount of the combined activator in the present composition. In order to obtain this synergistic activation, it is important that at least one of the ions selected being present in an amount of at least 0.005% by weight of the coating composition and that the sum of the amounts of the remaining ions selected being at least 0.005% by weight of the coating composition, the amounts of said ions being calculated as the respective metals. One more, including all of the components, however may be present in the activator composition in amounts greater than 0.005% w./v.

A particularly preferred activator is one containing tungsten and molybdenum in a combined amount within the desired range of activator composition of from 0.01 to 0.4% w./v. of the coating compositions. In such a preferred activator, the two components may be present in amounts within the range of 1.25 to 98.75% and 98.75 to 1.25% by weight of the activator, respectively. The components of the activator composition, i.e., the tungsten, molybdenum, arsenic, vanadium and uranium containing ions may be added to the solution in the form of various compounds which are ionizable in these coating solutions, such as tungstic acid, molybdic acid, vanadic acid, arsenic acid or uranic acid, as well as the various water soluble or water dispersable salts of these acids which will provide the desired metal ion when oxidized in the solution by the chromic acid or salts thereof. Exemplary of such salts which may be used are the sodium, potassium or ammonium salts of tungstic, molybdic, arsenic, vanadic or uranic acid.

In addition to the above components, in many instances it has also been found desirable to include in the subject composition an aluminum fluoride complex ion, which ion is desirably present in an amount equivalent to about 0.22 to about 3.2% w./v. of $Al(F)_x$. The aluminum fluoride complex ion is expressed as $Al(F)_x$ because, when used, it is present in the operating solution as an equilibrium of $Al(F)$ ion which may contain from 1 to 6 fluoride atoms per aluminum atom. In the solutions of the present invention, it has been found that this equilibrium averages out to be approximately equivalent to the $AlF_3$ ion. Accordingly, as used in the specification and claims, the expression $Al(F)_x$ is intended to represent any aluminum fluoride ion and the quantities thereof refer to an amount of such ion equivalent to the $AlF_3$ ion. This aluminum fluoride complex ion, when used, may be incorporated in the present composition as such or it may be formed in the composition as a complex from free aluminum and fluoride ions. In the later instance, the fluoride may be present as hydrofluoric acid, fluoboric acid, fluosilicic acid, or the like. Where the aluminum fluoride complex ion is added as such, it may be prepared by dissolving aluminum oxide ($Al_2O_3$) in water and hydrofluoric acid in appropriate proportions to obtain the requisite parts of $AlF_3$ for the composition.

Particularly preferred compositions of the present invention are those falling within the following formulation:

| Solution component: | Concentration percent w./v. |
|---|---|
| $CrO_3$ | 0.2–0.5 |
| Fluoride ions | 0.16–1.6 |
| Activator composition | 0.03–0.1 |
| $Al(F)_x$ complex | 0.22–1.9 |

The solutions of the present invention may be used to form coatings on surfaces containing aluminum, such as aluminum itself or aluminum alloys which are predominantly aluminum, using various coating techniques, such as dipping, brushing, spraying, flooding, or the like. Preferably, the solutions of the present invention are applied to the aluminum surfaces after these surfaces have been subjected to conventional cleaning procedures which free the surface to be treated of oil, grease, oxides, and the like. Additionally, the present solutions may be applied to the aluminum surfaces by atomizing the solution on the surface in a heated condition, in accordance with the procedure set forth in a copending application S.N. 728,095, filed Apr. 14, 1958. Generally stated, this atomization application technique includes the steps of preliminarily heating the aluminum or aluminum alloy surface to be coated to a temperature above about 65° C. and atomizing on the heated surface a quantity of the coating solution sufficient to form the desired coating but insufficient to cause the droplets of atomized coating solution to coalesce or puddle on the surface. The coating on the aluminum surface results from the substantially instantaneous flashing or volatilization of the liquid from the solution so that each individual atomized particle droplet remains substantially in the locus of its original contact with the surface treated.

Although the coating process of the present invention may be carried out effectively and with good efficiency over a wide range of solution temperatures and solution acidity, it has been found that the rate of coating may be improved and the coating efficiency increased by the concurrent selection and control of the degree of the acidity of the solution and its temperature of application. With regard to the temperature, it has been found that as the temperature of the operating solution is increased from room temperature, i.e., about 20 degrees C., up to about 50 degrees centigrade, the coating rate rapidly increases and in some instances, it is possible to obtain an increase in the coating rate of from 2 to 5 times that obtained at room temperature. At solution temperatures within the range of about 50 to about 70 degrees centigrade, the coating rate has been found to increase much more slowly and, for practical purposes, has been found to be substantially uniform throughout this temperature range. It is, therefore, preferred to utilize the solutions of the present invention at solution temperatures within the range of about 50 to about 70 degrees centigrade. Higher temperatures than 70 degrees centigrade may be employed, for example temperatures of 80 degrees centigrade or even up to the solution boiling point, but no particular advantages in terms of increased coating rates, are obtained by operating at such higher temperatures.

With regard to the pH of the operating solutions of the present invention, it has been found that this, as with the temperature, affects the coating rate and coating efficiency of the solution being applied to the aluminum-containing surfaces. Accordingly, it is desirable that the coating solution have a pH within the range of about 1.1 to about 2.3 and preferably in the range of about 1.6 to about 2.1. This pH range refers to measurements taken by using an electrical pH meter employing a glass electrode and a calomel electrode by immersing the electrodes in fresh portions of the operating solution and observing the indicated values.

In addition to the pH of the operating solution, it is also desirable that the operating solution have a concentration within the range of about 7 to about 15 points and once the concentration has been established, within this range, be maintained, under operating conditions, within ±0.5 point. The concentration of the operating solution, in points, is determined by the following procedure:

To a ten milliliter sample of the operating solution there is added 25 milliliters of 50% sulfuric acid and two drops of ortho-phenanthroline ferrous complex (ferroin) indicator. This solution is then titrated with 0.1 N ferrous sulfate in dilute sulfuric acid until the solution changes through blue to a reddish-brown color. The concentration points of the operating solution are the number of milliliters of 0.1 N titrating solution used. It is to be appreciated, that although the operating solution of the present invention is desirably used at a concentration within the range of 7 to 15 points, operation of the solution at both higher and lower point concentrations is not only possible, but in some instances, is preferred.

Following the application of the coating solution of the present invention to the aluminum containing surfaces to be treated, the thus-coated surfaces are then desirably rinsed with water. Either spray or immersion techniques for the water rinse may be used with rinsing times of 3 to 5 seconds duration being typical. Following the water rinse, if desired, the coated surface may be given an additional rinse with deionized water or with a dilute solution of hexavalent chromium. This latter rinse is preferably effected by spraying, rinsing times of 3 to 5 seconds duration at temperatures within the range of 55 to 65 degrees centigrade being typical. After the rinsing of the coated aluminum surface has been completed, the surfaces are preferably dried so as to remove any surface moisture. The coating thus-produced on the aluminum surfaces are slightly colored and vary in appearance from irridescent to light gold to yellow to brown. The color changes in the coatings produced may be used as a guide to the coating weights obtained, the darker colors being produced with higher coating weights and the lighter colors resulting from lower coating weights.

In formulating the operating solutions of the present invention, a make-up composition, containing the components desired in the operating solution, is admixed with water in amounts suitable to provide concentration of the components within the ranges as set forth hereinabove. Normally, in addition to the above-indicated components, the make-up composition may also contain an inorganic acid such as nitric acid or the like, in order to provide the desired acidity or pH. Suitable make-up compositions are those falling within the following formulation:

| Component: | Parts by weight |
| --- | --- |
| $CrO_3$ | 15–20 |
| HF | 4–7 |
| Inorganic acid, such as $HNO_3$ | 1–5 |
| Activator composition | 2–5 |
| $Al(F)_x$ (average $AlF_3$) | 3–6 |

It will be appreciated that this is a single package make-up composition as compared to the prior art compositions wherein separate packaging of some of the make-up components was often necessary.

In the operation of the process of the present invention, the components of the coating solution are depleted. Accordingly, in order to maintain these components in the operating solution within the preferred ranges which have been set forth hereinabove, it is desirable, in order to maintain a continuous operation, to periodically replenish the operating solution. One advantage of the composition of the present invention is that as in formulating the operating solution, this replenishing may be effected using a single package replenishing material, as opposed to many of the prior art compositions wherein separate addition of the components during replenishing is necessary. As with the make-up composition, in addition to the hexavalent chromium, fluoride, activator composition and aluminum fluoride complex components, it may also be desirable to include in the replenishing material an inorganic acid, such as nitric acid, hydrochloric acid and the like, so as to maintain the acidity or pH of the operating solution within the desired ranges as have been indicated hereinabove. Additionally, where the fluoride is added as hydrogen fluoride, rather than fluosilicic acid or fluoboric acid, it may also be desirable to include in the replenishing material a quantity of boric acid, to act as a buffer for the fluoride ions. This addition of boric acid may also be desirable in making up the original operating solution, where the fluoride ion is added as hydrogen fluoride, and particularly where the aluminum fluoride complex ion is not included in the composition. Where boric acid is included in the original operating solution, it is typically added in an amount withn the range of about 0.1 to about 0.2% w./v., although amounts up to its maximum solubility in the solution may be used.

A single package replenishing material suitable for use in maintaining the operating solution of the present invention in optimum coating forming conditions may contain the following components in the amounts indicated:

| Components: | Parts by weight |
|---|---|
| Hexavalent chromium (calculated as $CrO_3$) | 15 to 20 |
| HF | 7 to 12 |
| Inorganic acid, such as $HNO_3$ | 1.4 to 7 |
| Activator composition | 2 to 6.5 |
| $Al(F)_x$ (average $AlF_3$) | 0.4 to 1.6 |

Additionally, this composition may also contain from about 1–3 parts by weight of $H_3BO_3$ (boric acid).

A preferred replenishing material, having particular utility for use with a continuous strip-line operation, is one containing the following components in the amounts indicated:

| Components: | Parts by weight |
|---|---|
| $CrO_3$ | 18 to 20 |
| HF | 14 to 16 |
| $HNO_3$ | 5 to 7 |
| Activator composition | 3 to 6 |
| $Al(F)_x$ (average $AlF_3$) | 0.8 to 1.5 |

A preferred replenishing material, particularly suitable for production operation in which the parts to be coated are moved through a spray installation on a mono rail conveyor, is one having the following components in the amounts indicated:

| Components: | Parts by weight |
|---|---|
| $CrO_3$ | 15 to 17 |
| HF | 8 to 11 |
| $HNO_3$ | 4.5 to 6.5 |
| Activator composition | 3.5 to 6.5 |
| $Al(F)_x$ (average $AlF_3$) | 1 to 1.6 |

It will be appreciated that in the above make-up and replenishing compositions, the activator is preferably formed of at least two of the water soluble or dispersable salts of tungstic, molybdic, arsenic, vanadic or uranic acid.

As has been noted hereinabove, the composition of the present invention are characterized by their ability to effect a high coating rate with high coating efficiencies when the solution contains, as an impurity formed during the operation of the solution, trivalent chromium in an amount greater than 0.1% w./v., without the necessity for regenerating the solution, as with an ion exchanger. Although similar coating solutions but containing only tungsten, molybdenum, arsenic, vanadium or uranium, as the activating material are effective in obtaining high coating rates and coating efficiencies so long as the trivalent chromium content of the solutions is below about 0.1% w./v., where the trivalent chromium content exceeds this amount, there is often rapid decrease in both the coating rate and coating efficiency. It then becomes necessary to regenerate these solutions and remove the excessive amounts of trivalent chromium, for example by passing the solution through an ion exchange unit. Surprisingly, however, in the present composition which contains the activator composition made up of any two of tungsten, molybdenum, vanadium, arsenic or uranium, which combined activator is present in an amount equal to the amount of single activator in the prior composition, the components of the activator exert a synergistic action and high coating rates and coating efficiencies are consistently maintained during operation with the solution, even where the trivalent chromium content of the solution is appreciably greater than 0.1% w./v.

In order that those skilled in the art may better understand the present invention and the manner in which it may be practiced the following specific examples are given. In these examples, unless otherwise indicated, temperatures are in degrees centigrade, and amounts are in percent weight/volume. Additionally, the term "coating efficiency" refers to the quantity of coating formed relative to the amount of metal dissolved from the surface of the metal being coated and is specifically the ratio obtained by dividing the metal loss, in milligrams per square foot of surface treated, by the coating weight on the same area, in milligrams per square foot. Thus, as this numerical ratio decreases, the coating efficiency increases and the lowest numbers represent the highest efficiency of coating formation.

Example 1

6 liters of operating solution was formulated containing 0.33% $CrO_3$, 0.8% HF, 0.2% $H_3BO_3$, 0.3% aluminum, added as $Al(OH)_3$ and 0.3% trivalent chromium, added as chromic nitrate. To this solution was then added an additional 0.08% of HF and 10 grams of $$Na_2HAsO_4.7H_2O$$

(equivalent to 0.042% arsenic) and the solution was heated to a temperature of about 50° C. Panels of 3003 aluminum were weighed and then coated by spraying with the heated solution for a period of about 7 seconds. The coated panels were then rinsed by spraying with water for about 3 seconds and then dried. The coating weight on these panels and the coating efficiency obtained were determined to be 51.9 milligrams, per square foot and 0.434, respectively. Thereafter, to the coating solution there were added various quantities of $Na_2MoO_4.2H_2O$ (each gram added being equivalent to 0.0065% molybdenum) and preweighed panels of 3003 aluminum were coated in the manner described above. After rinsing, the panels were dried and the coating weight and coating efficiency were determined as above. Following this procedure, the amounts of sodium molybdate added and the coating weights and coating efficiencies obtained were as follows:

| Additions of $Na_2MoO_4.2H_2O$ in grams | Coating weights in milligrams per square foot | Coating efficiencies |
|---|---|---|
| 1 | 48.1 | 0.272 |
| 1 | 54.9 | 0.284 |
| 2 | 57.9 | 0.187 |

Example 2

A coating solution was made up as in Example 1. To this solution was then added an additional 0.08% of hydrogen fluoride and 10 grams of $Na_2HAsO_4.7H_2O$ (equivalent to 0.042% arsenic). Aluminum panels were coated as in Example 1 and it was determined that the coated panels had a coating weight of 35 milligrams per square foot and a coating efficiency of 0.940. Thereafter, additions of $Na_2WO_4.2H_2O$ were made to the operating solution and after each addition, aluminum panels were coated and the coating weights and coating efficiencies were determined as in Example 1. Each gram of the sodium tungstate added to the solution was equivalent to an addition of 0.01% tungsten. Using the above procedure, the sodium tungstate additions made and the coating weights and coating efficiencies obtained were as follows:

| Additions of $NaWO_4 \cdot 2H_2O$ in grams | Coating weights in milligrams per square foot | Coating efficiencies |
|---|---|---|
| 1 | 37.5 | 0.56 |
| 1 | 39.0 | 0.54 |
| 2 | 41.7 | 0.44 |
| 2 | 47.0 | 0.30 |

Example 3

A coating solution was made up as in Example 1 with the exception that the solution contained only 0.1% boric acid. To this solution was added 0.08% of hydrogen fluoride and 10 grams of $Na_2MoO_4 \cdot 2H_2O$. Aluminum panels were coated as in Example 1 and there was obtained a coating weight of 61 milligrams per square foot and a coating efficiency of 0.45. Thereafter, additions of $Na_2WO_4 \cdot 2H_2O$ were made to the operating solution and after each addition, the aluminum panels were coated and the coating weights and coating efficiencies were determined as in Example 1. The quantities of sodium tungstate added and the coating weights and efficiencies obtained were as follows:

| Additions of $Na_2WO_4 \cdot 2H_2O$ in grams | Coating weights in milligrams per square foot | Coating Efficiencies |
|---|---|---|
| 2 | 78 | 0.35 |
| 2 | 71 | 0.31 |
| 2 | 71 | 0.31 |
| 2 | 73 | 0.30 |

Example 4

A coating solution was formulated as in Example 1 and to this solution was added an additional 0.08% hydrogen fluoride and 0.5 gram of $Na_2WO_4 \cdot 2H_2O$. The aluminum panels were coated as in Example 1 and the coating weight and coating efficiency was determined to be 34.5 milligrams per square foot and 1.15, respectively. Thereafter, additions of $Na_2MoO_4 \cdot 2H_2O$ were made to the coating solution and after each addition, aluminum panels were coated and the coating weights and coating efficiency determined as in Example 1. The quantities of sodium molybdate added and the coating weights and coating efficiencies were as follows:

| Additions of $Na_2MoO_4 \cdot 2H_2O$ in grams | Coating weights in milligrams per square foot | Coating Efficiencies |
|---|---|---|
| 0.5 | 40 | 0.98 |
| 0.5 | 37 | 0.83 |
| 0.5 | 50 | 0.65 |
| 0.5 | 49 | 0.63 |
| 0.5 | 59 | 0.49 |
| 0.5 | 57 | 0.486 |
| 0.5 | 56 | 0.46 |
| 0.5 | 64 | 0.332 |
| 1.0 | 64.8 | 0.332 |

Example 5

A coating solution was formulated as in Example 1 and there was added thereto an additional 0.08% of hydrogen fluoride and 1 gram of $Na_2WO_4 \cdot 2H_2O$. An aluminum panel was coated as in Example 1 and the coating weight and coating efficiency thereof were determined to be 28.5 milligrams per square foot and 1.40, respectively. Thereafter, addition of $Na_2MoO_4 \cdot 2H_2O$ were made to the operating solution and after each addition aluminum panels were coated and the coating weight and coating efficiency were determined as in Example 1. The amounts of sodium molybdate added and the coating weights and coating efficiencies obtained were as follows:

| Additions of $Na_2MoO_4 \cdot 2H_2O$ in grams | Coating weights in milligrams per square foot | Coating Efficiencies |
|---|---|---|
| 0.5 | 38.7 | 1.10 |
| 0.5 | 44.4 | 0.62 |
| 0.5 | 44.7 | 0.53 |
| 0.5 | 46.5 | 0.49 |
| 0.5 | 52.8 | 0.45 |
| 0.5 | 60.0 | 0.33 |
| 0.5 | 51.0 | 0.39 |
| 0.5 | 58.8 | 0.34 |
| 0.5 | 55.5 | 0.31 |
| 1.0 | 56.3 | 0.303 |
| 1.0 | 57.0 | 0.30 |

Example 6

A coating solution was made up as in Example 1 and an additional 0.08 percent of hydrogen fluoride, 34 grams of $Na_2WO_4 \cdot 2H_2O$ and 0.5 gram of $Na_2MoO_4 \cdot 2H_2O$ were added thereto. As in Example 1, aluminum panels were coated with this solution and the coating weight obtained was determined to be 89.4 milligrams per square foot with a coating efficiency of 0.274. Thereafter, additions of $Na_2MoO_4 \cdot 2H_2O$ were made to the operating solution and after each addition, the aluminum panels were coated and the coating weights and coating efficiencies were obtained. The amounts of sodium molybdate added and the coating weights and coating efficiencies obtained were as follows:

| Additions of $Na_2MoO_4 \cdot 2H_2O$ in grams | Coating weights in milligrams per square foot | Coating Efficiencies |
|---|---|---|
| 0.5 | 86.7 | 0.252 |
| 1.0 | 91.2 | 0.236 |
| 1.0 | 101.4 | 0.222 |
| 1.0 | 89.7 | 0.230 |
| 1.0 | 97.8 | 0.238 |
| 1.0 | 98.7 | 0.238 |
| 1.0 | 98.9 | 0.236 |
| 1.0 | 98.7 | 0.237 |

Example 7

A coating solution was formulated as in Example 1. To this solution was added 5 grams of $Na_2WO_4 \cdot 2H_2O$ and an additional 0.16 percent of hydrogen fluoride. Aluminum panels were coated as in Example 1 and the coating weights obtained on these panels was determined to be 33 milligrams per square foot with a coating efficiency of 0.65. Thereafter, additions of $Na_2HAsO_4 \cdot 7H_2O$ were made to the coating solution and after each addition aluminum panels were coated and the coating weights and coating efficiency determined as in Example 1. The quantities of sodium arsenate added and the coating weights and coating efficiencies obtained were as follows:

| Additions of $Na_2HAsO_4 \cdot 7H_2O$ in grams | Coating weights in milligrams per square foot | Coating efficiencies |
|---|---|---|
| 2.0 | 39 | 0.61 |
| 2.0 | 42 | 0.40 |
| 2.0 | 47 | 0.28 |
| 2.0 | 56 | 0.23 |
| 2.0 | 55 | 0.136 |

Example 8

A coating solution was formulated which contained:

| | Percent |
|---|---|
| $Cr^{+3}$ | 0.30 |
| $Al^{+3}$ | 0.30 |
| $F^-$ | 0.84 |
| $CrO_3$ | 0.33 |
| $H_3BO_3$ | 0.20 |
| $WO_3^{-2}$ | 0.11 |

To this solution was added an additional 0.08% $F^-$, added as an aqueous HF solution and aluminum panels were coated with the solution as in Example 1. The coating weight and coating efficiency obtained were 33 milligrams per square foot and 1.70, respectively. Thereafter, additions of sodium vanadate ($Na_3VO_4 \cdot 10H_2O$) were made to the solution and after each addition, aluminum panels were coated and the coating weights and efficiencies determined, as above. Following this procedure, the quantities of sodium vanadate added and the coating weights and efficiencies obtained were as follows:

| Additions of $Na_3VO_4 \cdot 10H_2O$ in grams | Coating weights in milligrams per square foot | Coating efficiencies |
|---|---|---|
| 2 | 58 | 0.80 |
| 2 | 75 | 0.68 |
| 2 | 66 | 0.72 |
| 2 | 68 | 0.66 |
| 2 | 74 | 0.60 |
| 2 | 78 | 0.55 |
| 2 | 92 | 0.35 |

Example 9

A coating solution was formulated as in Example 8 with the exception that the $F^-$ content was 0.64% and that in place of the $WO_3^{-2}$ the solution contained 0.04% $As_2O_5$. To this solution was added an additional 0.16% $F^-$, as HF, and the aluminum panels were coated as in Example 8. The coating weight obtained was 43.5 milligrams per square foot and the coating efficiency was 0.552. Thereafter, additions of sodium vanadate were made to the solution, as in Example 8, panels were coated and the coating weights and efficiencies were determined. Using the procedure, the following results were obtained:

| Additions of $Na_2MoO_4 \cdot 10H_2O$ in grams | Coating weights in milligrams per square foot | Coating Efficiencies |
|---|---|---|
| 1 | 50.4 | 0.322 |
| 1 | 54.0 | 0.322 |
| 1 | 62.7 | 0.340 |
| 2 | 58.2 | 0.232 |

Example 10

A coating solution was formulated which contained:

| | Percent |
|---|---|
| $Cr^{+3}$ | 0.30 |
| $Al^{+3}$ | 0.26 |
| $F^-$ | 0.58 |
| $CrO_3$ | 0.29 |
| $WO_3^{-2}$ | 0.14 |

This solution was aged for 72 hours and an additional 0.08% $F^-$, as an aqueous HF solution, was added thereto. Aluminum panels were coated as in Example 1 and the coating weight and coating efficiency obtained were, 44.4 milligrams per square foot and 0.680, respectively. Thereafter, additions of sodium uranate ($Na_2UO_4$) were made to the solution and after each addition, panels were coated and the coating weights and efficiencies determined. Using this procedure, the following results were obtained:

| Additions of $Na_2UO_4$ in grams | Coating weights in milligrams per square foot | Coating Efficiencies |
|---|---|---|
| 1 | 62.1 | 0.478 |
| 1 | 64.5 | 0.470 |
| 1 | 59.4 | 0.404 |
| 1 | 55.2 | 0.402 |
| 2 | 57.3 | 0.370 |

Example 11

A coating solution was formulated as in Example 9. After the addition of about 0.16% $F^-$, as HF, aluminum panels were coated, as in Example 9, and the coating weight and coating efficiency obtained were 39.6 milligrams per square foot and 0.546, respectively. Thereafter additions of sodium uranate were made to the solution, as in Example 10, and after each addition aluminum panels were coated and the coating weights and coating efficiencies obtained were determined. Using this procedure, the following results were obtained:

| Additions of $Na_2UO_4$ in grams | Coating weights in milligrams per square foot | Coating efficiencies |
|---|---|---|
| 1 | 54.6 | 0.450 |
| 1 | 57.6 | 0.344 |
| 1 | 53.7 | 0.191 |

Example 12

A coating solution was formulated which contained:

| | Percent |
|---|---|
| $CrO_3$ | 0.50 |
| $F^-$ (added as $H_2SiF_6$) | 0.25 |
| $Cr^{+3}$ (added as chromic nitrate) | 0.03 |
| $Al(F)_x$ (average $AlF_3$) | 0.22 |
| Activator containing 75% tungsten and 25% molybdenum, added as $Na_2WO_4 \cdot 2H_2O$ and $Na_2MoO_4 \cdot 2H_2O$ respectively | 0.04 |

A 750 gallon tank for immersion coating was filled with this solution, which had a pH of 1.55 and a total fluoride content of 0.4%, and the solution was heated to a temperature of about 50° C. Panels of 3003 aluminum were immersed in this solution for 30 seconds to 1 minute and there was obtained on the panels adherent, gold-colored coatings having a coating weight within the range of 40–60 milligrams per square foot. The coating efficiency obtained was 0.25.

The procedure of the above examples is repeated using other activator compositions, including combinations of tungsten, molybdenum, and arsenic; arsenic, vanadium and uranium; tungsten, arsenic, vanadium and molybdenum; and arsenic, uranium, tungsten, molybdenum and vanadium, as well as other sources of hexavalent chromium and fluoride, including sodium and potassium dichromate and fluosilicic acid, respectively, to obtain similar results. The thus-produced coatings are found to be excellent paint base coatings and give very good results when painted and subjected to the 5% salt spray, humidity, adhesion and other physical tests. It is to be appreciated that as used in the specification and claims, the expression percent w./v. refers to the percent weight per unit volume of solution.

While there have been described various embodiments of the invention, the compositions and methods described are not intended to be understood as limiting the scope of the invention as it is realized that changes therewithin are possible and it is further intended that each element recited in any of the following claims is intended to be understood as referring to all equivalent elements for accomplishing substantially the same results in substantially the same or equivalent manner, it being intended to cover the invention broadly in whatever form its principle may be utilized.

What is claimed is:

1. A composition suitable for forming a protective coating on aluminum containing surfaces which consists essentially of an aqueous acidic solution, containing an effective coating amount of hexavalent chromium ions, fluoride ions in an amount effective to attack the aluminum surface being treated and at least 0.01% of an activator composition formed of at least two ions selected from the group consisting of tungsten, molybdenum, arsenic, vanadium and uranium, at least one of the ions selected being present in an amount of at least 0.005% by weight of the coating composition and the sum of the amounts of the remaining ions selected being at least 0.005% by weight of the coating composition, the amounts of said ions being calculated as the respective metals, which composition is characterized by its ability to maintain high coating rates and coating efficiencies when operated in the presence of trivalent chromium ions in amounts in excess of 0.1% by weight of the composition.

2. The composition as claimed in claim 1 wherein there is also present an aluminum fluoride complex.

3. A composition suitable for forming a protective coating on aluminum containing surfaces which consists essentially of an aqueous acidic solution containing, in percent w./v., 0.05 to 1 hexavalent chromium ions, calculated as $CrO_3$, 0.16 to 2.7 fluoride ions, and 0.01 to 0.4 of an activator composition formed of at least two ions selected from the group consisting of tungsten, molybdenum, arsenic, vanadium and uranium, at least one of the ions selected being present in an amount of at least 0.005% by weight of the coating composition and the sum of the amounts of the remaining ions selected being at least 0.005% by weight of the coating composition, the amounts of said ions being calculated as the respective metals, which composition is characterized by its ability to maintain high coating rates and coating efficiencies when operated in the presence of trivalent chromium ions in an amount in excess of about 0.1% by weight of the solution.

4. The composition as claimed in claim 3 wherein the solution also contains, in percent w./v., 0.22 to 3.2 $Al(F)_x$ complex.

5. The composition as claimed in claim 4 wherein the solution contains in percent w./v. 0.2 to 0.5 hexavalent chromium ions, calculated as $CrO_3$, 0.16 to 1.6 fluoride ions, 0.03 to 0.1 of the activator composition, and 0.22 to 1.9 $Al(F)_x$ complex.

6. The composition as claimed in claim 3 wherein the activator composition is formed of tungsten and molybdenum and the tungsten is present in the activator composition in an amount within the range of 1.25 to 98.75% by weight of the activator composition and the molybdenum is present in an amount within the range of 98.75 to 1.75% by weight of the activator composition.

7. The composition as claimed in claim 5 wherein the activator composition is formed of tungsten and molybdenum, and the tungsten is present in an amount within the range of 1.25 to 98.75% by weight of the activator composition and the molybdenum is present in an amount within the range of 98.75 to 1.25% by weight of the activator composition.

8. A method of forming a protective coating on aluminum-containing surfaces which comprises contacting the surface to be treated with an aqueous acidic solution which consists essentially of an effective coating amount of hexavalent chromium ions, fluoride ions in an amount effective to attack the surface being treated, and at least 0.01% of an activator composition formed of at least two ions selected from the group consisting of tungsten, molybdenum, arsenic, vanadium and uranium, at least one of the ions selected being present in an amount of at least 0.005% by weight of the coating composition and the sum of the amounts of the remaining ions selected beins at least 0.005% by weight of the coating composition, the amounts of said ions being calculated as the respective metals, and maintaining the solution in contact with the surface until the desired protective coating is formed, which method is characterized by its ability to effect high coating rates and coating efficiency when the coating solution contains trivalent chromium ions in an amount in excess of about 0.1% by weight of the coating solution.

9. The method as claimed in claim 8 wherein the aqueous acidic solution also contains an aluminum fluoride complex ion.

10. A method for forming a protective coating on aluminum containing surfaces which comprises contacting the surface to be treated with an aqueous acidic solution which consists essentially of, in percent w./v. 0.05 to 1 hexavalent chromium ions, caluculated as $CrO_3$, 0.16 to 2.7 fluoride ions, 0.01 to 0.4 of an activator composition formed of at least two ions selected from the group consisting of tungsten, molybdenum, arsenic, vanadium and uranium, at least one of the ions selected being present in an amount of at least 0.005% by weight of the coating composition and the sum of the amounts of the remaining ions selected being at least 0.005% by weight of the coating composition, the amounts of said ions being calculated as the respective metals, and maintaining the said aqueous acidic solution in contact with the surface to be treated until the desired protective coating is formed, which method is characterized by its ability to maintain high coating rates and coating efficiencies when operated with a coating solution containing trivalent chromium ions in an amount in excess of about 0.1% by weight of the coating solution.

11. The method as claimed in claim 10 wherein the aqueous acidic solution also contains, in percent weight by volume, 0.22 to 3.2 $Al(F)_x$ complex.

12. The method as claimed in claim 11 wherein the aqueous acidic solution contains, in percent w./v., 0.2 to 0.5 hexavalent chromium ion, calculated as $CrO_3$, 0.16 to 1.6 fluoride ions, 0.03 to 0.1 activator composition, and 0.22 to 1.9 $Al(F)_x$ complex.

13. The method as claimed in claim 10 wherein the activator composition in the aqueous acidic solution is formed of tungsten and molybdenum and the tungsten is present in an amount within the range of about 1.25 to 98.75% by weight of the activator composition and the molybdenum is present in an amount within the range of 98.75 to 1.25% by weight of the activator composition.

14. The method as claimed in claim 12 wherein the activator composition is formed of tungsten and molybdenum and the tungsten is present in an amount within the range of 1.25 to 98.75% by weight of the activator composition and the molybdenum is present in an amount within the range of 98.75 to 1.25% by weight of the activator composition.

15. A replenishing material for forming solutions for coating aluminum containing surfaces which consists essentially of, in parts by weight:

| | |
|---|---|
| $CrO_3$ | 15–20 |
| HF | 7–12 |
| Inorganic acid | 1.4–7 |
| $Al(m)_x$ (average $AlF_3$) | 0.6–1.6 |
| Activator composition | 3–6.5 | wherein the activator composition is formed of at least two materials selected from the group consisting of water soluble salts of tungstic, molybdic, arsenic, vanadic, and uranic acids, and wherein at least one of said materials is present in an amount of at least 1.25% by weight of the activator composition.

16. The replenishing material as claimed in claim 15 wherein there is contained, in parts by weight, $CrO_3$, 18 to 20; HF, 10 to 12; $HNO_3$, 5 to 7; activator composition, 3 to 6; $Al(F)_x$, 0.8 to 1.5.

17. The replenishing material as claimed in claim 15 wherein there is contained in parts by weight: $CrO_3$, 15 to 17; HF, 8 to 11; $HNO_3$, 4.5 to 6.5; activator composition, 3.5 to 6.5; and $Al(F)_x$, 1 to 1.6.

18. A makeup composition, suitable for forming aqueous acidic solutions for coating aluminum containing surfaces, which consist essentially of, in parts by weight:

| | |
|---|---|
| $CrO_3$ | 15–20 |
| HF | 4–7 |
| Inorganic acid | 1–5 |
| $Al(F)_x$ (average $AlF_3$) | 3–6 |
| Activator composition | 2–5 | wherein the activator composition is formed of at least two materials selected from the group consisting of water-soluble salts of tungstic, molybdic, arsenic, vanadic, and uranic acid, and wherein at least one of said materials is present in an amount of at least 1.25% by weight of the activator composition.

19. An aluminum surface having a coating thereon produced in accordance with the method as claimed in claim 8.

20. An aluminum surface having a coating therein produced in accordance with the method of claim 14.

References Cited

UNITED STATES PATENTS

| | | | |
|---|---|---|---|
| 2,868,679 | 1/1959 | Pimbley | 148—6.2 |
| 2,948,643 | 8/1960 | Pimbley | 148—6.2 |
| 2,967,791 | 1/1961 | Halversen | 148—6.27 X |
| 3,066,055 | 11/1962 | Pimbley | 148—6.2 X |

RALPH S. KENDALL, *Primary Examiner.*

UNITED STATES PATENT OFFICE
CERTIFICATE OF CORRECTION

Patent No. 3,391,031                                                                  July 2, 1968

William S. Russell et al.

It is certified that error appears in the above identified patent and that said Letters Patent are hereby corrected as shown below:

Column 4, line 69, "$CrO_3$)" should read -- Hexavalent chromium ions (Calculated as $CrO_3$) --. Column 7, line 7, "withn" should read -- within --. Column 10, line 46, "$Na_2HASO.7H_2O$" should read -- $Na_2HASO_4.7H_2O$ --. Column 11, first table, first column, line 7 thereof, "2" should read -- 8 --.

Signed and sealed this 31st day of March 1970.

(SEAL)
Attest:

Edward M. Fletcher, Jr.                                   WILLIAM E. SCHUYLER, JR.
Attesting Officer                                                      Commissioner of Patents